UNITED STATES PATENT OFFICE.

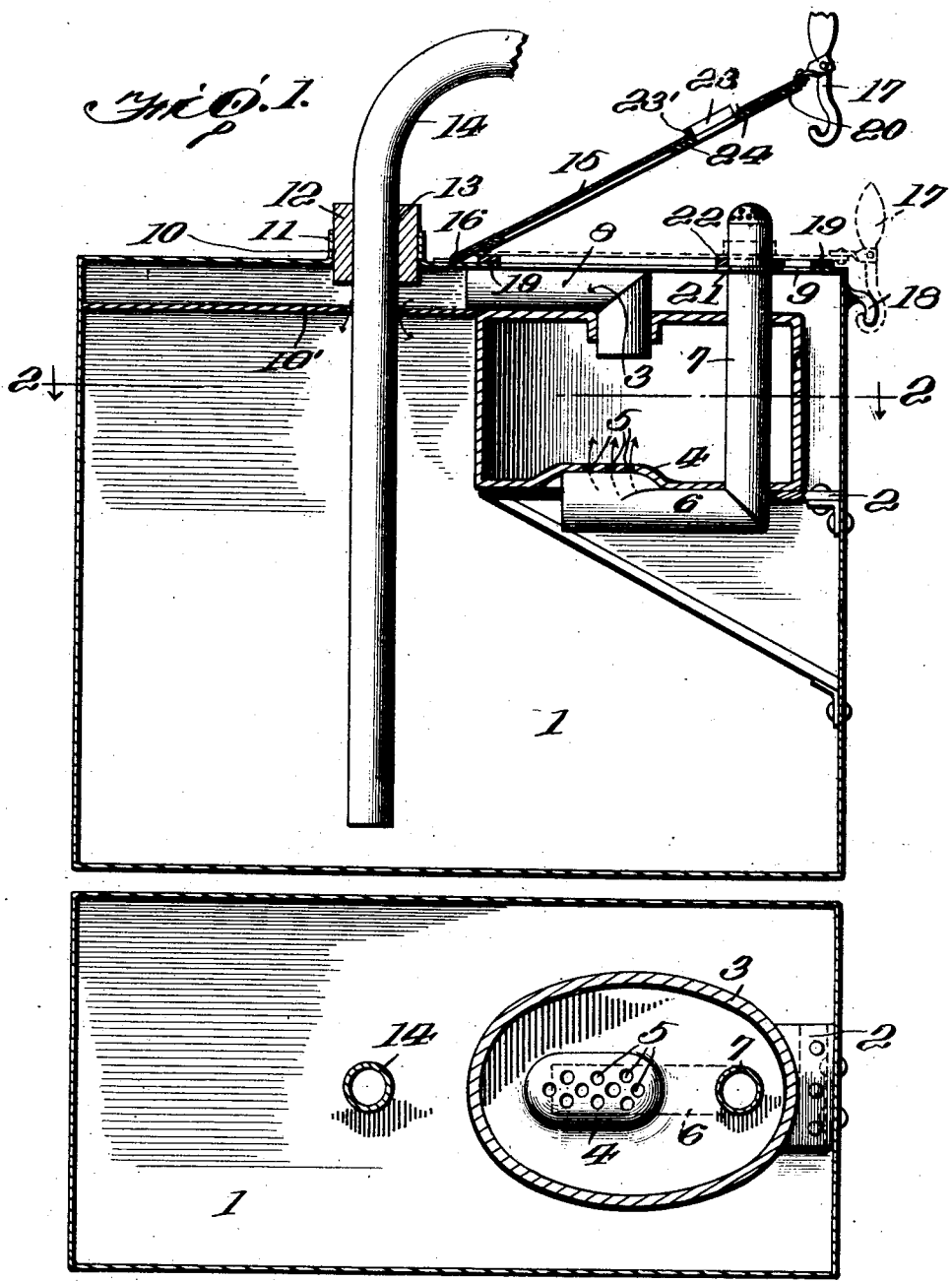

OTTO F. WAGENHORST, OF AKRON, OHIO.

LIQUID-FOOD CONTAINER.

1,366,438. Specification of Letters Patent. Patented Jan. 25, 1921.

Application filed October 18, 1918, Serial No. 258,754. Renewed November 8, 1920. Serial No. 422,700.

*To all whom it may concern:*

Be it known that I, OTTO F. WAGENHORST, a citizen of the United States, residing at Akron, in the county of Summit, State of Ohio, have invented certain new and useful Improvements in Liquid-Food Containers of which the following is a description, reference being had to the accompanying drawing and to the figures of reference marked thereon.

In an application executed of even date herewith, I have described and claimed an improvement in gas masks, one of the features of which consists in providing the mask with an arrangement whereby liquid nourishment, medicine or water may be supplied to the wearer of the mask without removal of the same.

The present invention relates to improvements in a container for water, liquid food or medicine, the object being to provide a container which may be used with perfect safety, even in a gassed zone, to supply soldiers with food, water or medicine.

The container is so constructed as to be connected to a rubber tube leading from the mask, so that the contents thereof may be sucked through the tube by the wearer of the mask, and I have also provided, within the body of the container and thoroughly protected, a canister containing filtering material through which the air necessary to be drawn into the container to enable the contents to be expelled, may be purified before going into the contents. The invention, therefore, consists in matters hereinafter described and referred to in the appended claims.

In the accompanying drawings—

Figure 1 is a longitudinal vertical sectional view of my improved container;

Fig. 2 is a horizontal sectional view taken on the line 2—2 of Fig. 1.

Referring now to the drawings, 1 represents my improved container which, as shown, is of a rectangular form and preferably of a size to hold about ten gallons of liquid, such as water, milk or the like, and would weigh about 80 pounds, so that it could be readily conveyed from place to place by a single person. Within said container, at one end, is a bracket 2, upon which is supported the canister 3. The said canister, as shown in Fig. 2 of the drawings, is of an oval form and is adapted to contain, or be filled with a composition which will thoroughly filter the air of all poisonous gases, all of which is well understood and covered by other patents and needs no further description. The upper end of the canister is a short distance below the upper end of the container to leave a space for the air discharge pipe, as will be later described. The canister is made air-tight and is provided at the bottom with an upwardly pressed portion 4, having a series of openings 5, communicating with the air intake pipe 6. This pipe 6 has an air-tight connection with the lower face of the canister and extends upwardly therethrough, as indicated at 7, and extends beyond the upper end of the container. The upper end of the canister has communicating therewith the discharge air pipe 8, which extends horizontally and has its outer end open and communicating with the upper end of the container.

The canister rests upon the bracket 2 and can be readily removed through an opening 9 in the upper end of the container, so that a new canister may be readily inserted in case the old one should in any way become defective. The container, as shown, is closed by an air-tight top 10, having an opening 11, in which is arranged a plug 12, forming an air-tight joint within the opening to prevent any leakage of air to the container. The plug 12 is provided with an opening 13, through which passes a rubber tube 14 which extends adjacent to the lower end of the container. The said tube is of considerable length and is adapted to have its outer free end secured to the feeding tube of the gas mask heretofore referred to and thus the wearer of the mask may suck the contents of the container, which is either water, milk or the like. A diaphragm 10' is placed on the inside of the container to prevent the liquid splashing into the opening leading to the canister, this diaphragm fitting loosely around the food outlet tube to allow suitable draft.

The opening 9, as heretofore described, is directly above the canister and is provided with a cover 15 hinged at its inner end at 16, and provided with a pivoted latch 17 at its outer end, adapted to catch over the hooked member 18, carried by the side of the container, as shown in dotted lines in Fig. 1. The top of the container surrounding the opening 9 is provided with a gasket 19, and the lower face of the cover is also provided with a gasket 20, adapted to rest upon the gasket 19, when the cover is closed, and thus form a tight joint to prevent the entry of any poisonous gas around the cover into the container. The air intake pipe 7 of the canister is provided with a horizontally arranged flange 21, in horizontal alinement with the upper end of the container, and which supports a gasket 22. The cover 15 is provided with an opening 23, having an upwardly extending flange 23′, through which the air intake pipe 7 of the canister extends when the cover is closed. The flange forms a support for the pipe and is carried by the cover on its lower face and surrounding the opening 23 is a gasket 24 which engages the gasket 22 and forms a tight joint to prevent the entry of poisonous gases around the air intake pipe 7 of the canister.

From the foregoing description, it will be seen that I have provided a container, in which air passes thereto through a filtering canister, so that the contents of the container can be readily withdrawn through the tube by suction. I also provide a container in which the canister is formed entirely independent, but providing for the ready insertion thereof, as well as providing a container in which it is impossible for any air to enter the same except through the canister.

Having thus described my invention, what I claim as new and desire to secure by Letters Patent, is:

1. A container of the character described comprising a receptacle for holding liquid nourishment, a discharge tube connected thereto, a canister within the receptacle sealed therefrom, and having an air discharge opening in communication with the receptacle and above the level of the liquid therein, and an air intake pipe for the canister extending through the receptacle.

2. A container of the character described comprising a receptacle, a discharge tube connected thereto, a cover for said receptacle, a canister removably supported within the upper end of the receptacle and sealed therefrom and having an air discharge opening in communication with the receptacle above the level of the liquid therein, and an air intake pipe for the canister and extending through the cover and having an air tight connection therewith.

3. A container of the character described comprising a receptacle, a discharge tube connected thereto, a cover for said receptacle, a canister removably supported within the upper end of the receptacle sealed therefrom, and having an air discharge opening communicating with the receptacle above the level of the liquid in the receptacle, and an air intake pipe for the canister extending through the receptacle and having an air tight connection therewith.

4. A container of the character described comprising a receptacle, a discharge tube connected thereto, its lower end extending to a point adjacent the bottom thereof, and a canister supported within the upper end of the receptacle and sealed therefrom and having an air intake tube communicating with the outside atmosphere and adapted to discharge the filtered air to the receptacle above the liquid level therein.

5. A container for holding liquid nourishment comprising a receptacle provided with a discharge tube opening at its lower end at a point adjacent the bottom of said receptacle, a canister adapted to contain filtering material and with means for supporting it in the upper part of said receptacle, said canister being sealed from the receptacle and having an air inlet pipe extending out through the top of the receptacle and delivering air into the bottom of said canister and having an air outlet communicating through the wall of the canister into the receptacle above the liquid level thereof, whereby in the withdrawal of the liquid contents from the receptacle the air necessary to permit the withdrawal thereof will be drawn first through the filtering material in the canister before striking the liquid in the receptacle.

6. A container of the character described comprising a receptacle, a discharge tube extending down through the upper end to a point adjacent the bottom, said receptacle having an opening in its upper end, a hinged cover closing said opening, a gasket carried by the receptacle around said opening, a gasket carried by the cover and engaging the gasket carried by the receptacle, means for clamping the cover in a closed position, a bracket within the receptacle below the cover, a canister supported by the bracket, an air discharge pipe connected to the upper end of the canister and extending horizontally, an air intake pipe connected to the lower end of the canister and extending upwardly through an opening in the cover, a flange carried by said pipe, a gasket carried by said flange, and a gasket carried by the cover around the opening and engaging the gasket carried by the air intake tube.

In testimony whereof, I affix my signature, in the presence of two witnesses.

OTTO F. WAGENHORST.

Witnesses:
C. R. YOUNG,
W. A. HELFER.